United States Patent
van der Made et al.

(10) Patent No.: US 10,157,629 B2
(45) Date of Patent: Dec. 18, 2018

(54) LOW POWER NEUROMORPHIC VOICE ACTIVATION SYSTEM AND METHOD

(71) Applicant: Brainchip Inc., Aliso Viejo, CA (US)

(72) Inventors: Peter A J van der Made, Aliso Viejo, CA (US); Mouna Elkhatib, Irvine, CA (US); Nicolas Yvan Oros, Irvine, CA (US)

(73) Assignee: BrainChip Inc., Aliso Viejo, CA (US)

( * ) Notice: Subject to any disclaimer, the term of this patent is extended or adjusted under 35 U.S.C. 154(b) by 0 days.

(21) Appl. No.: 15/425,861

(22) Filed: Feb. 6, 2017

(65) Prior Publication Data

US 2017/0229117 A1   Aug. 10, 2017

Related U.S. Application Data

(60) Provisional application No. 62/291,691, filed on Feb. 5, 2016.

(51) Int. Cl.
*G10L 15/02* (2006.01)
*G10L 15/07* (2013.01)
(Continued)

(52) U.S. Cl.
CPC .............. *G10L 25/78* (2013.01); *G06F 3/167* (2013.01); *G06N 3/049* (2013.01); *G06N 3/10* (2013.01);
(Continued)

(58) Field of Classification Search
None
See application file for complete search history.

(56) References Cited

U.S. PATENT DOCUMENTS

| | | | | |
|---|---|---|---|---|
| 6,081,782 A | * | 6/2000 | Rabin | G06F 21/32 704/246 |
| 6,539,253 B2 | * | 3/2003 | Thompson | A61N 1/025 607/2 |

(Continued)

OTHER PUBLICATIONS

Blanka, "Unlock Siri-like apps with 3-D voice processing." DSP Group http://www.edn.com/5G/4406219/Unlock-Siri-like-apps-with-3-D-voice-processing Feb. 4, 2013.

(Continued)

*Primary Examiner* — Marcus T Riley
(74) *Attorney, Agent, or Firm* — Sterne, Kessler, Goldstein & Fox, PLLC

(57) ABSTRACT

The present invention provides a system and method for controlling a device by recognizing voice commands through a spiking neural network. The system comprises a spiking neural adaptive processor receiving an input stream that is being forwarded from a microphone, a decimation filter and then an artificial cochlea. The spiking neural adaptive processor further comprises a first spiking neural network and a second spiking neural network. The first spiking neural network checks for voice activities in output spikes received from artificial cochlea. If any voice activity is detected, it activates the second spiking neural network and passes the output spike of the artificial cochlea to the second spiking neural network that is further configured to recognize spike patterns indicative of specific voice commands. If the first spiking neural network does not detect any voice activity, it halts the second spiking neural network.

17 Claims, 4 Drawing Sheets

(51) Int. Cl.
  *G10L 25/78* (2013.01)
  *G06N 3/04* (2006.01)
  *G06N 3/10* (2006.01)
  *G06F 3/16* (2006.01)
  *G10L 25/30* (2013.01)
  *G10L 15/08* (2006.01)

(52) U.S. Cl.
  CPC ........ *G10L 25/30* (2013.01); *G10L 2015/088* (2013.01)

(56) References Cited

U.S. PATENT DOCUMENTS

| | | |
|---|---|---|
| 7,076,315 B1 | 7/2006 | Watts |
| 7,174,299 B2 | 2/2007 | Fujii et al. |
| 7,203,651 B2 | 4/2007 | Baruch et al. |
| 7,319,959 B1 * | 1/2008 | Watts ............... G10L 15/02 704/254 |
| 7,885,818 B2 * | 2/2011 | Vignoli ............ G10L 21/0272 704/246 |
| 8,250,011 B2 | 8/2012 | Van Der Made |
| 9,020,870 B1 * | 4/2015 | Daily ................ G06N 3/049 706/20 |
| 9,245,527 B2 * | 1/2016 | Lindahl ............. G10L 15/32 |
| 9,269,043 B2 * | 2/2016 | Nugent ............. G06N 3/049 |
| 9,502,048 B2 * | 11/2016 | Every ............ G10L 21/0208 |
| 9,721,566 B2 * | 8/2017 | Newendorp ........ G10L 15/32 |
| 2006/0206320 A1 * | 9/2006 | Li ................. G10L 21/0208 704/226 |
| 2010/0161335 A1 | 6/2010 | Whynot |
| 2011/0035215 A1 * | 2/2011 | Sompolinsky ....... G10L 15/02 704/231 |
| 2014/0058478 A1 * | 2/2014 | Fruhauf ........... A61N 1/36032 607/57 |
| 2014/0278416 A1 * | 9/2014 | Schuster ............. G10L 17/00 704/246 |
| 2014/0278437 A1 | 9/2014 | Shen et al. |
| 2015/0106085 A1 * | 4/2015 | Lindahl ............. G10L 15/32 704/231 |
| 2015/0112689 A1 | 4/2015 | Nandy et al. |
| 2015/0339570 A1 * | 11/2015 | Scheffler ............ G06N 3/04 706/16 |
| 2015/0379397 A1 * | 12/2015 | van der Made ..... G06N 3/049 706/20 |
| 2017/0229117 A1 * | 8/2017 | van der Made ..... G06N 3/049 |

OTHER PUBLICATIONS

Jarng, "Noise Reduction Algorithm applied for Hearing Aids." ASTL 25:261-266 Jul. 18, 2013.

* cited by examiner

LOW POWER NEUROMORPHIC VOICE ACTIVATION SYSTEM AND METHOD

CROSS REFERENCE TO RELATED APPLICATION

This application claims benefit to U.S. Provisional Patent Application 62/291,691, filed Feb. 5, 2016, the disclosures of which are hereby incorporated by reference in their entirety.

FIELD OF THE INVENTION

The present invention relates to a neuromorphic voice activation apparatus and method and more particularly, to a method and apparatus for allowing a user to control an electronic device by means of voice commands in an artificial neural network.

BACKGROUND

A portable electronic device, such as mobile phones, tablets, laptops or media players, includes a user interface that can use systems like speech recognition for initiating a process or performing a task without providing tactile inputs. However, the conventionally used speech recognition system cannot be used very frequently as it consumes more power and memory to perform core functions such as turning ON/OFF the device, changing modes of the device, reading emails etc., thus resulting in high computational cost, and thus high energy consumption which is prohibitive in a portable device Existing prior art solutions provide technologies for controlling such portable devices through speech recognition systems. One such system is disclosed in a US Patent Application number US20150106085A1 that provides a system for parallel speech recognition processing of multiple audio signals produced by multiple microphones in a handheld portable electronic device. A primary processor transitions to a power-saving mode while an auxiliary processor remains active. The auxiliary processor then monitors the speech of a user of the device to detect a wake-up command by speech recognition processing the audio signals in parallel. When the auxiliary processor detects the command, it then signals the primary processor to transition to active mode. The auxiliary processor may also identify to the primary processor which microphone resulted in the command being recognized with the highest confidence.

Another U.S. Pat. No. 9,020,870B1 disclosing a recall system using spiking neuron networks to identify an unknown external stimulus is provided. The recall system includes one or more processors and a memory, with the memory storing computer code which, when executed by the one or more processors, cause the one or more processors to perform the operations described herein. For example, the system receives a first input signal (having spatial-temporal data) originating from a known external stimulus. The spatial-temporal data is converted into a first spike train. The first spike train is received in a spiking neuron network that generates a first set of polychronous groups (PCGs) as a result of the first spike train.

Another U.S. Pat. No. 6,081,782A provides a voice command control and verification system and method to store for each authorized user, one or a series of speech models of voice commands or phrases uttered by the authorized user. Each speech model has an associated action component which specifies the specific action that the authorized user desires in response to the issuance of the corresponding voice command. User's identity is verified; thereafter a voice command is generated. Voice command is matched. If there is a match, claimed identity and voice command corresponding to it are verified. Upon successful verification, the command is executed in accordance with the associated action component.

Further, the portable devices such as mobile phones or tablets have multiple inbuilt microphones in order to improve quality of audio signals provided to the speech recognition system. For an instance, if a user is speaking in crowded area, it would be difficult to separate acoustic signal from the background noise, or it would be difficult to detect accurate word or sentence. So, the issues like understanding of syntax and semantics may occur while providing speech signal in real time. Furthermore, for the conventional speech recognition system, at least part of the speech recognition system may be running all the time and it also requires significant digital signal processing to select the "best" microphones to use and then generate the signal. Thus, it may result in too much power consumption and time delay.

In order to solve the aforementioned problems of high power consumption, time delay, high computational cost and the like, a neuromorphic system for controlling a wireless device by means of voice commands processed by an artificial neural network is provided.

SUMMARY

The present invention allows a user to control a wireless device by means of voice commands in an artificial neural network. The present invention utilizes a neuromorphic system that is an electronic implementation of neural systems. Using a neuromorphic system over a traditional processor will increase the efficiency of the devices as it consumes very little power. Also, the neuromorphic system could be employed to develop artificial retinas, cochleae and the like that would allow computers to sense the world around them as it will be able to provide real time data.

In a first aspect of the present invention, a system for controlling an electronic device through voice control commands is provided. The system comprises a hierarchical arrangement of a first spiking neural network and a second spiking neural network, said first spiking neural network receives output spikes from an artificial cochlea, said first spiking neural network configured to learn and subsequently recognize spike patterns, in the output spikes, that indicates presence of a human voice activity in the output spikes, and said first spiking neural network activates said second spiking neural network from a low energy halted or off state, if any voice activity is detected, in the output spikes, by said first spiking neural network. The second spiking neural network performs a cognitive and learning function aiming to detect the spike patterns, in the output spikes from the artificial cochlea, indicative of specific voice commands. The electronic device is a portable wireless device such as a mobile phone, a laptop, a smartphone and the like. The device includes one or more digital microphones; one or more decimation filters coupled to the digital microphones and to the artificial cochlea; and the hierarchical arrangement of the first spiking neural network and the second spiking neural network. The first spiking neural network and the second spiking neural network are made of a plurality of artificial neurons interconnected with a plurality of synapses. The second spiking neural network configured to recognize spike patterns indicative of specific voice commands, comprising: a means for receiving spikes from the first spiking neural network representative of the voice activity; a means for associating received spikes, by activating neurons within the second spiking neural network, by triggering synaptic activity derived from training; and a means for producing an output that is representative of at least one voice command. The second spiking neural network is in halted or OFF state, when the spike pattern indicative of any voice activity is not detected by the first spiking neural network. The system is configured to reject background noise by selectively rejecting certain bandwidths of an input signal within the artificial cochlea. The system is a hard wired digital logic design running at a low clock speed. The system further includes a 'labeling and decode' logic to generate interrupt to a digital signal processor based on the activity of the first and second spiking neural networks In a second aspect of the present invention, a method for allowing a user to control an electronic device by means of voice commands is provided. The method comprising: receiving, an output of parallel spikes, by a first spiking neural network from an artificial cochlea; detecting a presence of a voice activity in the output spikes, by the first spiking neural network; and activating a second spiking neural network, by the first spiking neural network, when a voice activity is detected. The method further comprises passing the output spikes to the second spiking neural network; and recognizing spike patterns in the output spikes, by the second spiking neural network, that indicates at least one specific voice command in the output spikes. The artificial cochlea receives a pulse code modulation signal from one or more decimation filters and produces the output of parallel spikes to send to the first spiking neural network. The one or more decimation filters receive a pulse density modulation signal from one or more microphones to convert the pulse density modulation signal into the pulse code modulation signal; and said one or more digital microphones receive and convert the voice signal, spoken by a user, into the pulse density modulation signal. The first spiking neural network halts the second spiking neural network when no voice activity is detected. The first spiking neural network and the second spiking neural network include a plurality of artificial neurons interconnected by a plurality of digital synapses. The electronic device is a portable wireless device such as a mobile phone, a laptop, a smartphone and the like.

BRIEF DESCRIPTION OF DRAWINGS

The preferred embodiment of the invention will hereinafter be described in conjunction with the appended drawings provided to illustrate and not to limit the scope of the invention, wherein like designation denote like element and in which.

DETAILED DESCRIPTION

In the following detailed description of embodiments of the invention, numerous specific details are set forth in order to provide a thorough understanding of the embodiment of invention. However, it will be obvious to a person skilled in art that the embodiments of invention may be practiced with or without these specific details. In other instances, well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

In an embodiment of the present invention, a system and method for activating and controlling an electronic device by voice commands is provided. This system can be implemented by using a neural network. In other words, this system can be implemented using a neuromorphic chip, which is an electronic system that mimics the function of human brain, thus includes a neural network. A neural network comprises a plurality of neurons and a plurality of synapses that carry information or pulses to a target neuron. One dendrite of a neuron and one axon of another neuron are connected by a biological structure called a synapse. The synapse receives feedback from the post-synaptic neuron which causes the efficacy of the connection to be modified. Pluralities of networked neurons are triggered in an indicative spatial and temporal activation pattern as a result of a specific input signal pattern. Each input spike relates to an event. An event can be described as the occurrence of a specific frequency in an audio stream, the occurrence of a dark to light transition in visual information, and a plethora of other physical phenomena that are detectable by the senses. Feedback of output spikes to synapses drives a process known as spike time dependent plasticity, commonly abbreviated as STDP, whereby the strength of a synapse is modified depending on the temporal difference of input to output spikes. This process is thought to be responsible for learning and memory functions in the brain.

In the neuromorphic system, signals detected by sensors, such as video cameras, microphones and the like are routed to the network of neurons and synapses. The detected signals are converted into spikes that travel to axons through wired or wireless mean and make contact with digital switches that correspond to the neurons. Depending on the strength of spikes, it is further fanned out to other neurons via axons and synapses. In this way, the neural network makes sense of patterns of signals and learns by identifying repeating patterns. The system can be deployed in various applications such as in computation, medical science etc.

Figure 1A:
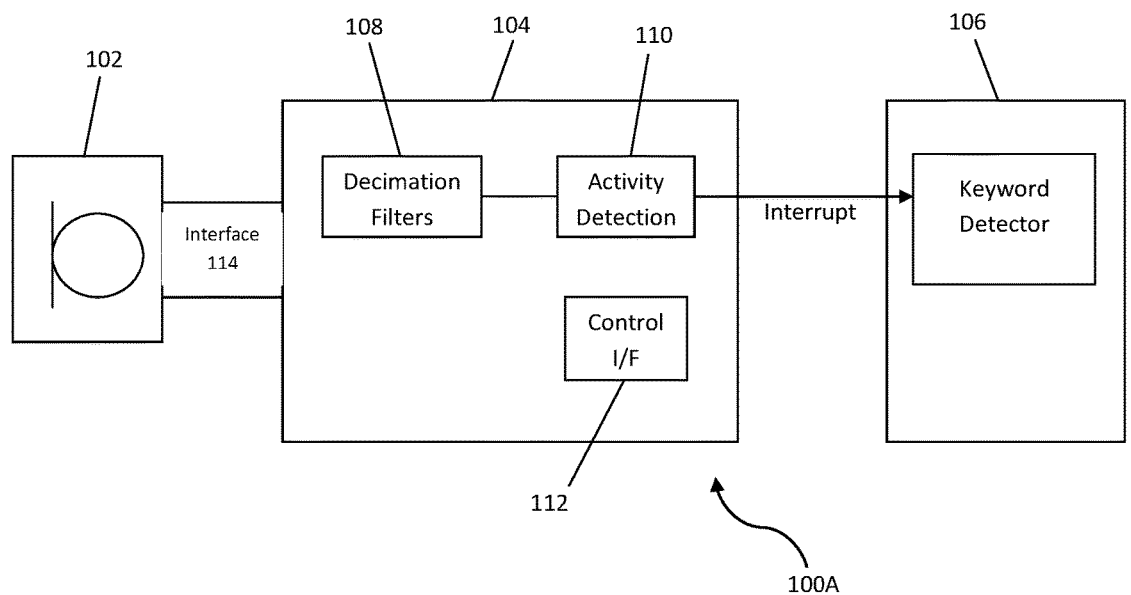
FIG. 1A illustrates a schematic representation of an activity detection system using a digital signal processor (DSP) or a codec to process keyword detection using an external application processor (APPS) as implemented in existing solutions.

FIG. 1A illustrates a schematic representation of an activity detection system using a digital signal processor (DSP) or a codec to process keyword detection using an external application processor (APPS) as implemented in prior existing solutions. The activity detection system 100A comprises a microphone 102, a digital signal processor (DSP) or a codec unit 104, and an application processor or a keyword detector 106. The digital signal processor 104 further comprises a decimation filter 108, an activity detection module 110 and a control interface (I/F) 112. The microphone 102 is connected via a digital interface 114 to the decimation filter 108. The microphone 102 integrates an analog to digital converter, and outputs an undecimated 1-bit stream in pulse density modulation (PDM) format. The decimation filter 108 receives the 1-bit stream at a clock rate with a defined range and converts the pulse density modulation signal into a pulse code modulation signal (PCM), which is a multi-bit packet format. The defined range of clock rate may be, but not limited to, 6 kHz to 6 MHz. When the digital signal processor 104 detects any activity, such as speech, through the activity detection block 110, it wakes up the application processor 106 and starts sending the microphone's data to the application processor 106 for further processing. The application processor 106 performs keyword detection from the received speech. However, this is a high power consuming system, since a false alarm can also issue a wakeup interrupt for the application processor 106 to process the keyword detection.

Figure 1B:
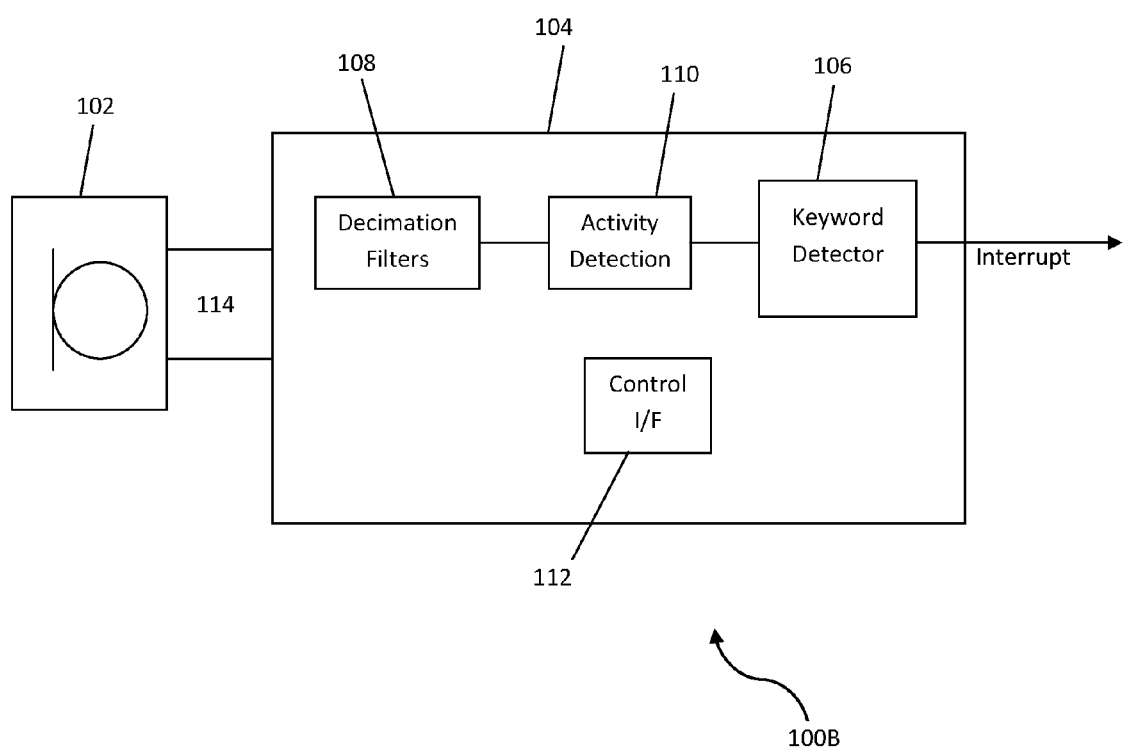
FIG. 1B illustrates a schematic representation of an activity detection system allowing a digital signal processor (DSP) or a codec to process keyword detection itself in the DSP or the codec as implemented in existing solutions.

Since the system explained in FIG. 1A uses high power, to overcome the problem, an enhanced system 100B is provided in FIG. 1B. FIG. 1B illustrates a schematic representation of an activity detection system 100B allowing a digital signal processor (DSP) or a codec unit to process keyword detection itself in the DSP or the codec. The activity detection system 100B comprises the microphone 102 and the digital signal processor or a codec unit 104. The digital signal processor 104 further comprises the decimation filter 108, the activity detection module 110, the application processor or a keyword detector 106 and a control interface (I/F) 112. The microphone 102 is connected via the digital interface 114 to the decimation filter 108. The output of the microphone 102 is in pulse density modulation (PDM) format, which is a single bit digital signal. The decimation filter 108 converts the pulse density modulation signal, received from the microphone 102 at a clock rate with a defined range, into a pulse code modulation signal (PCM), which is a multi-bit packet format. The defined range of clock rate may be, but not limited to, 6 kHz to 6 MHz. When the digital signal processor 104 detects any activity such as speech through the activity detection module 110, the keyword detector 106 present in the digital signal processor 104 wakes up and detects the relevant keywords for processing the request.

In order to make a lower power system, the system 100B implements the application processor or the keyword detector 106 inside the digital signal processor 104. Thus, the system 100B is the lower power system; the application processor 106 will wake up only when a keyword is detected. The system 100B also includes the activity detection to minimize the silence use case power in the codec itself. However, this solution is also not minimizing the power in 100% silence use case. To overcome the problems of power consumption, time delay and the like present in the existing methods, a method for activating and controlling a portable electronic device by voice commands in an efficient manner is provided in the present invention.

Figure 2:
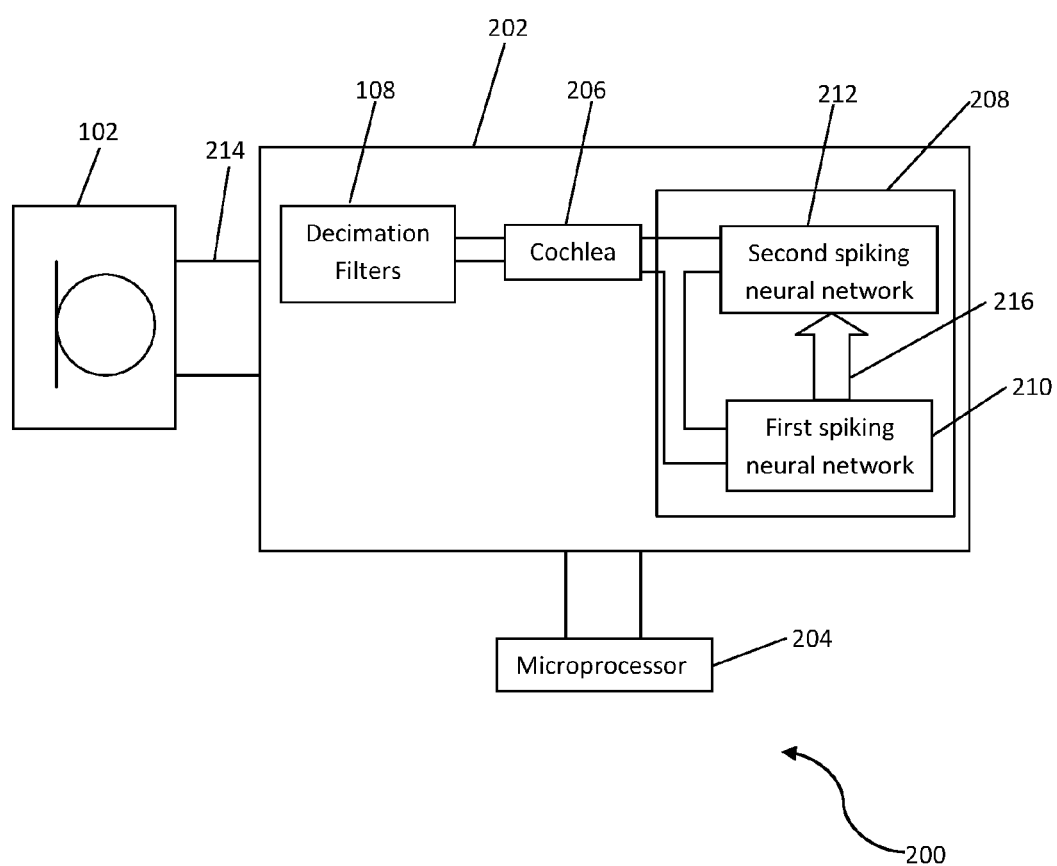
FIG. 2 illustrates a schematic representation of a neuromorphic voice activation system, in accordance with an embodiment of the present invention.

FIG. 2 illustrates a schematic representation of a low power consumption neuromorphic voice activation system, in accordance with an embodiment of the present invention. The present invention provides a system and a method of activating and controlling a portable electronic device using voice commands by sampling a digital microphone. A stream of pulse density modulation (PDM) encoded audio is received from the digital microphone, where the pulse density modulation produces digital single-bit encoded audio signals. The PDM signal is converted into a pulse code modulated signal by a decimation filter. Pulse Code Modulation (PCM) is a known method of producing a multi-bit representation of audio signals. The PCM signal is input to a digital cochlea circuit. The artificial cochlea simulates the functions of the basilar membrane and the inner hair cells of a biological cochlea. A multitude of sensory neuron circuits, connected to the output of the inner hair cell circuits, produce spikes that represent basilar membrane pressures, and thus represent a frequency spectrum and pressure of the original audio signal. The spikes are input to one or more artificial neural networks to detect the presence and meaning of speech, present in the original audio signal.

In an embodiment of the present invention, a system for activating an electronic device through voice commands using two or more artificial spiking neural networks implemented in a digital hardware circuit is provided. The system comprises a first spiking neural network and a second spiking neural network arranged in a hierarchical manner and is configured to process the information. The system is configured to receive and process information from a variety of sources in a variety of forms, such as audio source, image source, and video source from a microphone or from an image sensor. Each of the first spiking neural network and the second spiking neural network comprises a plurality of digital artificial neurons connected to each other through digital synapses. The first spiking neural network performs a cognitive and learning function aiming to detect patterns, in output spikes from an artificial cochlea, which are indicative of a voice activity. The second spiking neural network performs a cognitive and learning function aiming to detect voice patterns in the output spikes indicative of specific commands.

Referring to FIG. 2, the neuromorphic voice activation system 200 includes one or more digital microphones 102, a neuromorphic chip 202 and a microprocessor 204. The neuromorphic chip 202 further comprises one or more decimation filters 108, an artificial cochlea circuit 206, a spiking neuron adaptive processor (abbreviated as SNAP) 208. The spiking neuron adaptive processor (SNAP) 208 further comprises a first spiking neural network 210 and a second spiking neural network 212.

The digital microphone 102 is connected via a digital interface 214 to the decimation filter 108. When any speech activity occurs, the digital microphone 102 captures the speech signal and sends the captured speech or audio signal to the decimation filter 108. The output of the digital microphone 102 is in Pulse Density Modulation (PDM) format, which is a single bit digital signal. The decimation filter 108 converts the pulse density modulation signal, received from the digital microphone 102 at a clock rate with a defined range, into a pulse code modulation signal (PCM), which is a multi-bit packet format. The defined range of the clock rate may be, but not limited to, 6 kHz to 6 MHz. The PCM packets are received by the artificial cochlea 206, which produces temporal and spatial distributed output spike streams. The artificial cochlea 206 is a device that models human cochlea with emphasis on voice band. The output spike streams from the artificial cochlea 206 are fed to the first spiking neural network 210 and then the second spiking neural network 212 present in the spiking neuron adaptive processor (SNAP) 208.

The first spiking neural network 210 performs a cognitive and learning function aiming to detect patterns, in the output spike streams, that are representative of a meaningful voice activity. When the first spiking neural network 210 detects a voice activity, it activates the second spiking neural network 212 through a digital interface 216. When the second spiking neural network 212 is in active state, it performs a cognitive and learning function aiming to detect voice patterns, in the voice activity, indicative of specific commands. In case, the first spiking neural network 210 does not detect temporal/spatial spike patterns that are indicative of any voice activity, it deactivates the second spiking neural network 212. In other words, if the first spiking neural network 210 does not detect a voice activity, the second spiking neural network 212 remains in low energy halted or OFF state. In this way, the spiking neuron adaptive processor (SNAP) 208 processes data on the basis of the first spiking neural network 210 and the second spiking neural network 212 and outputs specific voice commands that are further fed to the microprocessor 204. The microprocessor 204 further processes the detected voice commands to control the electronic device.

The neuromorphic chip 202 uses the output spikes from the artificial cochlea 206 to detect a speech activity and based on this information it either wakes-up the SNAP 208 or keep it in suspended mode. Hence, the SNAP 208 minimizes the power in 100% silence use case. In an embodiment, the neuromorphic chip 202 includes a 'labeling and decode logic' to generate an interrupt to a digital signal processor based on the activity of the artificial spiking neural network.

The neuromorphic voice activation system 200 based on the artificial cochlea 206 and the spiking neuron adaptive processor (SNAP) 208 is a low power implementation. The SNAP is a hard wired digital logic circuit running at a low clock speed that allows aggressive voltage scaling of the supply to minimize power consumption. The neuromorphic voice activation system 200 utilizes a parallel processing neuromorphic engine that permits to increase the number of keywords without impacting the speed. The present invention provides a hardware based solution for speech recognition, thus no program memory such as SRAM, ROM and the like is required to store software code as present in the existing solutions. This improves leakage and dynamic power. The present invention mimics the biological auditory system and thus has higher hit rate performance than existing solutions. As the neuromorphic voice activation system 200 is specifically focused on detecting speech activity, it provides a better performance in noisy environment.

Figure 3:
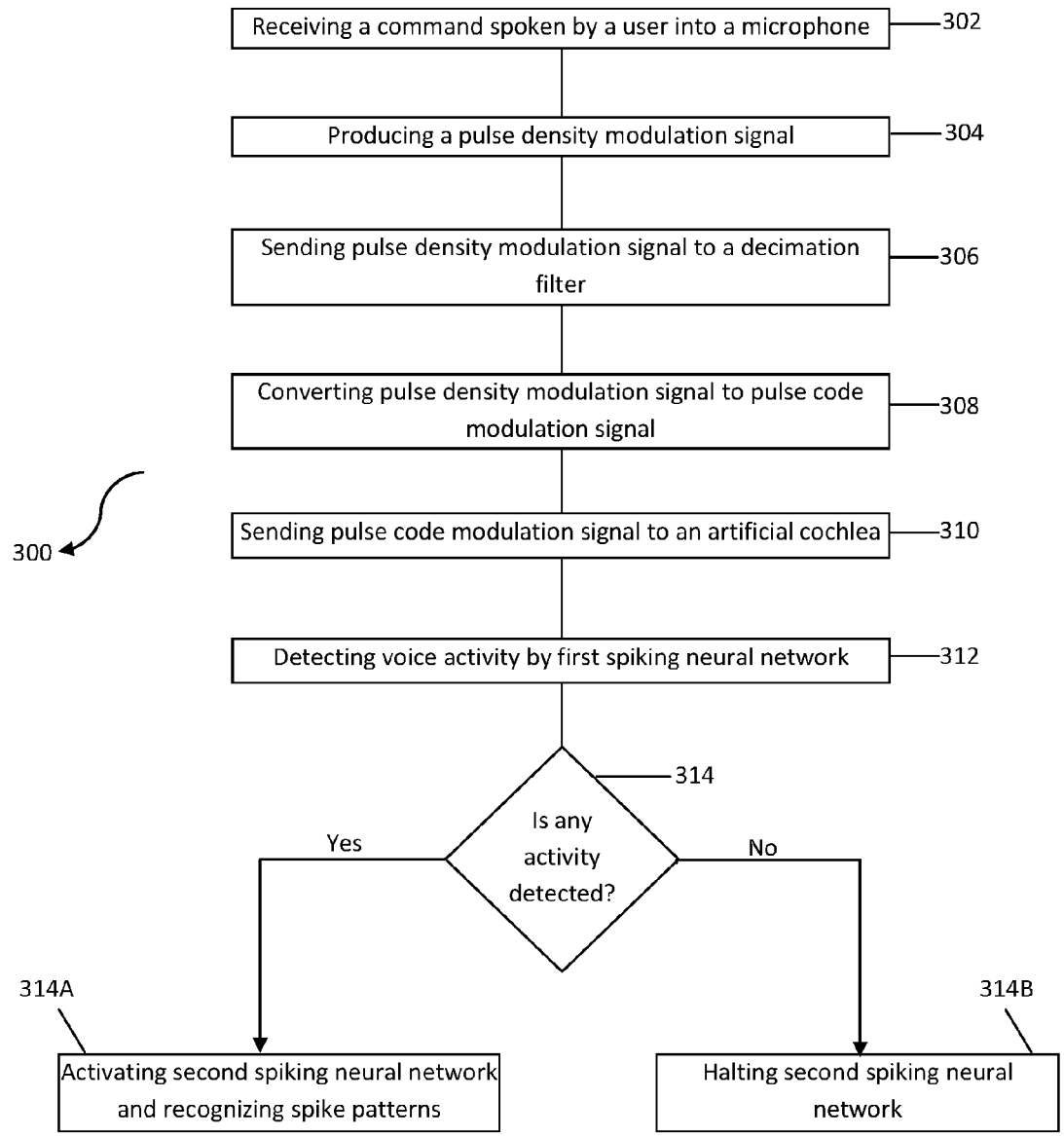
FIG. 3 illustrates a method for voice activation using artificial neural network, in accordance with an embodiment of the present invention.

FIG. 3 illustrates a method for voice activation using an artificial neural network, in accordance with an embodiment of the present invention. The method 300 includes a step 302, at which, a microphone receives a voice command spoken by a user. At step 304, the command produces an output that is defined as a pulse density modulation (PDM) signal. The PDM signal is then passed to a decimation filter at step 306 and converted into a pulse code modulation (PCM) signal at step 308. At step 310, an artificial cochlea, receives the PCM signal and thus, produces an output of parallel spikes. Each series and number of output spikes represents intensity and frequency of part of the spectrum of the voice command. The artificial cochlea is configured as a digital emulation of a biological cochlea. The output spikes from the artificial cochlea is then passed to a first spiking neural network, at step 312, where the first spiking neural network is configured to detect a specific voice activity in the output spikes from the artificial cochlea.

In other words, the output spikes from the artificial cochlea are input to a spiking neuron adaptive processor (abbreviated as SNAP). SNAP has one or more spiking neural networks to detect the presence and meaning of a minimalistic speech pattern in the original audio signal or a voice command from the user. At step 314, the first spiking neural network checks whether any voice activity is detected or not. If any speech or voice activity is detected, the first spiking neural network activates a second spiking neural network, at step 314A and passes the output spike from the artificial cochlea to the second spiking neural network. The second spiking neural network is configured to recognize spike patterns, in the output spikes, that are indicative of specific voice commands. Further, if the first spiking neural network does not detect any voice activity; it does not wake up the second spiking neural network, at step 314B.

The present invention has advantages over existing solution for speech recognition as the spiking neural adaptive processor is hardware based architecture rather than software based architecture. The system is configured to reject background noise by selectively rejecting certain bandwidths of an input voice signal within the artificial cochlea. Further, the system is a hard wired digital logic circuit running at a low clock speed, thereby allowing aggressive voltage scaling of the supply to minimize power consumption. The chip or processor makes itself useful in certain situations as they use a layered structure of neural network. For an instance, the present invention do not separate computation and memory, thus the information is stored in synaptic strength resulting in faster performance utilizing less power. In an embodiment of the present invention, the system can be used in commercial or industrial application, control and navigation, voice dialing, medical, military, aerospace, court reporting, home automation, hands free computation, automatic translation, mobile telephony, including mobile email, interactive voice response, speech-to-text reporter, telematics, multimodal interaction, transcription, robotics, video games and the like.

The invention claimed is:

1. A neuromorphic system for controlling an electronic device through voice control commands, the system comprising:
   a spiking neuron adaptive processor comprising a hierarchical arrangement of a first spiking neural network and a second spiking neural network, wherein the first spiking neural network is configured to:
   receive output spikes from an artificial cochlea, wherein the artificial cochlea is configured to produce the output spikes based on a pulse code modulation signal, wherein one or more decimation filters convert a pulse density modulation signal into the pulse code modulation signal, and wherein one or more microphones convert a voice signal into the pulse density modulation signal;
   perform a cognitive and learning function that detects spike patterns in the output spikes, wherein the spike patterns indicate a presence of a voice activity in the output spikes; and
   activate the second spiking neural network through a digital interface from a low energy halted or off state based on the presence of the voice activity in the output spikes.

2. The system of claim 1, wherein the second spiking neural network is configured to perform a second cognitive and learning function that detects the spike patterns in the output spikes from the artificial cochlea are indicative of specific voice commands.

3. The system of claim 1, wherein the electronic device is a portable wireless device.

4. The system of claim 1, wherein the electronic device comprises one or more digital microphones, one or more decimation filters coupled to the digital microphones and the artificial cochlea, and the hierarchical arrangement of the first spiking neural network and the second spiking neural network.

5. The system of claim 1, wherein the first spiking neural network and the second spiking neural network comprise a plurality of artificial neurons interconnected with a plurality of synapses.

6. The system of claim 1, wherein the second spiking neural network comprises a plurality of artificial neurons interconnected with a plurality of synapses, wherein the second spiking neural network is configured to:
recognize the spike patterns as indicative of specific voice commands, wherein the recognizing comprises:
receiving the output spikes from the first spiking neural network representative of the voice activity;
associating the output spikes with the specific voice commands by activating a portion of a plurality of artificial neurons within the second spiking neural network in response to triggering synaptic activity derived from training; and
producing an output that is representative of at least one voice command.

7. The system of claim 1, wherein the second spiking neural network is in the halted or the off state when the spike patterns indicative of the presence of the voice activity are not detected by the first spiking neural network.

8. The system of claim 1, wherein the artificial cochlea is configured to reject background noise by selectively rejecting certain bandwidths of an input signal within the artificial cochlea.

9. The system of claim 1, wherein the system is a hard wired digital logic circuit running at a low clock speed.

10. The system of claim 1, further comprising a labeling and decode logic to generate an interrupt to a digital signal processor based on the activation of the second spiking neural network.

11. A method for allowing a user to control an electronic device by using voice commands, the method comprising:
receiving, by one or more microphones, a voice signal;
converting, by the one or more microphones, the voice signal into a pulse density modulation signal;
converting, by one or more decimation filters, the pulse density modulation signal into a pulse code modulation signal,
producing, by an artificial cochlea, an output of parallel spikes based on the pulse code modulation signal;
detecting, by a first spiking neural network, a presence of voice activity in the output of parallel spikes; and
activating, by the first spiking neural network, a second spiking neural network based on the presence of the voice activity, wherein the second spiking neural network is configured to perform a cognitive and learning function that detects spike patterns in the output of parallel spikes from the artificial cochlea that are indicative of specific voice commands.

12. The method of claim 11, further comprising:
passing, by the first spiking neural network, the output of parallel spikes to the second spiking neural network; and
recognizing, by the second spiking neural network, the spike patterns in the output of parallel spikes that are indicative of the specific voice commands.

13. The method of claim 11, wherein the first spiking neural network deactivates the second spiking neural network when no voice activity is detected.

14. The method of claim 11, wherein the artificial cochlea is configured as a digital emulation of a biological cochlea.

15. The method of claim 11, wherein the first spiking neural network and the second spiking neural network comprise a plurality of artificial neurons interconnected by a plurality of digital synapses.

16. The method of claim 11, wherein the electronic device is a portable wireless device.

17. The method of claim 14, wherein the artificial cochlea is configured to detect frequencies in a bandwidth of the voice signal.

* * * * *